US011222238B2

(12) United States Patent
Schulter et al.

(10) Patent No.: US 11,222,238 B2
(45) Date of Patent: Jan. 11, 2022

(54) OBJECT DETECTION WITH TRAINING FROM MULTIPLE DATASETS

(71) Applicant: NEC Laboratories America, Inc., Princeton, NJ (US)

(72) Inventors: Samuel Schulter, New York, NY (US); Gaurav Sharma, Newark, CA (US); Yi-Hsuan Tsai, Santa Clara, CA (US); Manmohan Chandraker, Santa Clara, CA (US); Xiangyun Zhao, San Jose, CA (US)

(73) Assignee: NEC Corporation

( * ) Notice: Subject to any disclaimer, the term of this patent is extended or adjusted under 35 U.S.C. 154(b) by 0 days.

(21) Appl. No.: 17/094,261

(22) Filed: Nov. 10, 2020

(65) Prior Publication Data

US 2021/0150275 A1 May 20, 2021

Related U.S. Application Data

(60) Provisional application No. 62/935,103, filed on Nov. 14, 2019.

(51) Int. Cl.
*G06K 9/62* (2006.01)
*G06K 9/00* (2006.01)
*G06N 3/04* (2006.01)
*G06K 9/20* (2006.01)

(52) U.S. Cl.
CPC ....... *G06K 9/6257* (2013.01); *G06K 9/00805* (2013.01); *G06K 9/2054* (2013.01); *G06K 9/6293* (2013.01); *G06N 3/04* (2013.01)

(58) Field of Classification Search
CPC .. G06K 9/6257; G06K 9/6293; G06K 9/2054; G06K 9/628
See application file for complete search history.

(56) References Cited

PUBLICATIONS

Cour et al., "Learning from Partial Labels", The Journal of Machine Learning Research. vol. 12. May 2011. pp. 1501-1536.
Kirkpatrick et al., "Overcoming catastrophic forgetting in neural networks", Proceedings of the National Academy of Sciences of the United States of America. vol. 114, No. 13. Mar. 28, 2017. pp. 3521-3526.
Uijlings et al., "Revisiting knowledge transfer for training object class detectors", Proceedings of the IEEE International Conference on Computer Vision. Jan. 30-31, 2018. pp. 1101-1110.
Yang et al., Detecting 11K Classes: Large Scale Object Detection without Fine-Grained Bounding Boxes, Proceedings of the IEEE International Conference on Computer Vision. Oct. 27-Nov. 2, 2019. pp. 9813-2019.
Wang et al., "Towards Universal Object Detection by Domain Attention", Proceedings of the IEEE Conference on Computer Vision and Pattern Recognition. Jun. 16-20, 2020. pp. 7289-7298.

*Primary Examiner* — Sam Bhattacharya
(74) *Attorney, Agent, or Firm* — Joseph Kolodka

(57) ABSTRACT

Methods and systems for object detection include training dataset-specific object detectors using respective annotated datasets, each of the annotated datasets including annotations for a respective set of one or more object classes. The annotated datasets are cross-annotated using the dataset-specific object detectors. A unified object detector is trained, using the cross-annotated datasets, to detect all of the object classes of the annotated datasets. Objects are detected in an input image using the unified object detector.

20 Claims, 6 Drawing Sheets

OBJECT DETECTION WITH TRAINING FROM MULTIPLE DATASETS

RELATED APPLICATION INFORMATION

This application claims priority to U.S. Patent Application No. 62/935,103, filed on Nov. 14, 2019, incorporated herein by reference entirety.

BACKGROUND

Technical Field

The present invention relates to image classification and, more particularly, to the detection of objects within an image using multiple datasets with heterogeneous label spaces.

Description of the Related Art

Object detection seeks to localize and categorize objects within a given image. Training data is needed for every object category that is to be detected. However, many object detection systems are limited to detecting only a single class of objects, or a fixed number of specific object classes.

SUMMARY

A method for object detection includes training dataset-specific object detectors using respective annotated datasets, each of the annotated datasets including annotations for a respective set of one or more object classes. The annotated datasets are cross-annotated using the dataset-specific object detectors. A unified object detector is trained, using the cross-annotated datasets, to detect all of the object classes of the annotated datasets. Objects are detected in an input image using the unified object detector.

A system for object detection includes a hardware processor and a memory. The memory is configured to store computer program code that is executed by the hardware processor and that includes machine learning code that implements a plurality of dataset-specific object detectors, machine learning code that implements a unified object detector, dataset-specific training code, unified training code, and object detection code. The plurality of dataset-specific object detectors each detect and annotates objects within input images according to training by a respective annotated dataset. Each of the annotated datasets includes annotations for a respective set of one or more object classes. The dataset-specific object detectors cross-annotate the annotated datasets. The unified object detector that detects and annotates objects within input images according to training by multiple datasets. The dataset-specific training code trains the plurality of dataset-specific object detectors using respective annotated datasets. The unified training code trains the unified object detector, using the cross-annotated datasets, to detect all of the object classes of the annotated datasets. The object detection code detects objects in an input image using the unified object detector.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Object detection may be used for a variety of purposes, such as autonomous driving (e.g., identifying people and vehicles in an image) and computer vision tasks like tracking, pose estimation, and pose recognition. Datasets that identify different respective classes of image object may be combined to train image detection classifiers on all of the different classes. A challenge in combining training datasets, where objects of the relevant class are identified within each image, is that these disparate datasets may each include images that show objects from other classes. Thus, if a dataset A is used to locate objects A within images, and if a dataset B is used to locate objects B within images, naively combining the two datasets may decrease the accuracy of the resulting classifier, because some objects B may be present within images of dataset A, and some objects A may be present within images of dataset B.

Rather than manually annotating all of the datasets with object designations for each of the other classes (e.g., rather than manually identifying objects B within images from dataset A), respective single-class classifiers may be used to automatically locate objects within the other datasets. Thus, a classifier A, trained on the dataset A to detect objects A, may be run on dataset B to provide annotations within the images of dataset B that indicate the presence of objects A. These automatically annotated datasets may then be used in combination to train a combined classifier that can locate any of the object classes within an input image.

Figure 1:
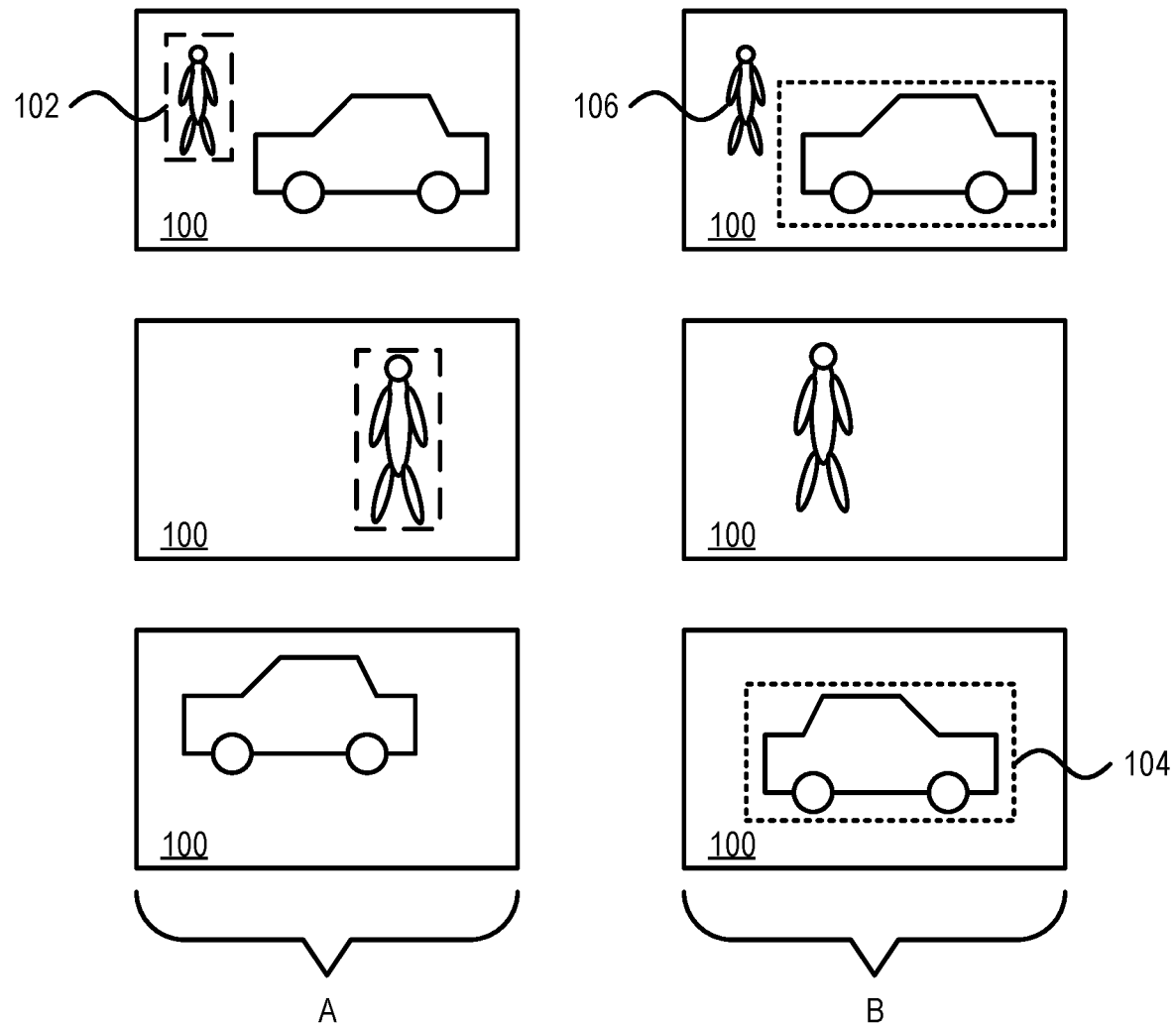
FIG. 1 is a diagram that shows annotated datasets, where images from each dataset include unannotated objects that are annotated within the other dataset, in accordance with an embodiment of the present invention.

Referring now in detail to the figures in which like numerals represent the same or similar elements and initially to FIG. 1, two training datasets are shown. A first dataset, labeled A, is annotated with people, while the second dataset, labeled B, is annotated with automobiles. Each dataset includes multiple images 100, each of which may include zero, one, or more objects of the relevant class.

For example, dataset A indicates the presence of a person with a bounding box 102. Dataset B indicates the presence of an automobile with a bounding box 104. However, each dataset includes images 100 that have objects from the other dataset's class. Thus, for example, images 100 from dataset B may include people 106 who are not annotated with a bounding box. If the images 100 from dataset B are included in a training dataset for a classifier that identifies people, there may be at least some images 100 in the combined dataset which include people as part of the background of the image. This produces inconsistent training data, where some objects are annotated and some are not.

One approach to generating a dataset that adequately trains a classifier to recognize multiple images classes would be to manually annotate initial training datasets, train the multi-class object detection system, and evaluate the system using a set of validation images. Then, if the classifier fails to provide adequate performance for any object class, additional training data could be obtained that is specific to that object class. However, in such a case, the additional training data would need to be re-annotated for all of the other classes, even those with adequate performance in the classifier, lest the new training data undermine the efficacy of those classifications.

And, once a classifier has already been trained, adding a new class of objects poses a similar challenge. In such a case, every image of the original training dataset would need to be re-annotated to identify the new class of objects, in addition to annotating the new dataset with each of the original classes.

To address these challenges, a single-class classifier, trained on a respective annotated dataset, may be used to identify objects pertaining to that class in other training datasets. Thus, following the example above, a classifier A, trained on dataset A to identify people, may be used on dataset B to identify people within that dataset. This avoids the time and cost needed to manually re-annotate datasets.

Figure 2:
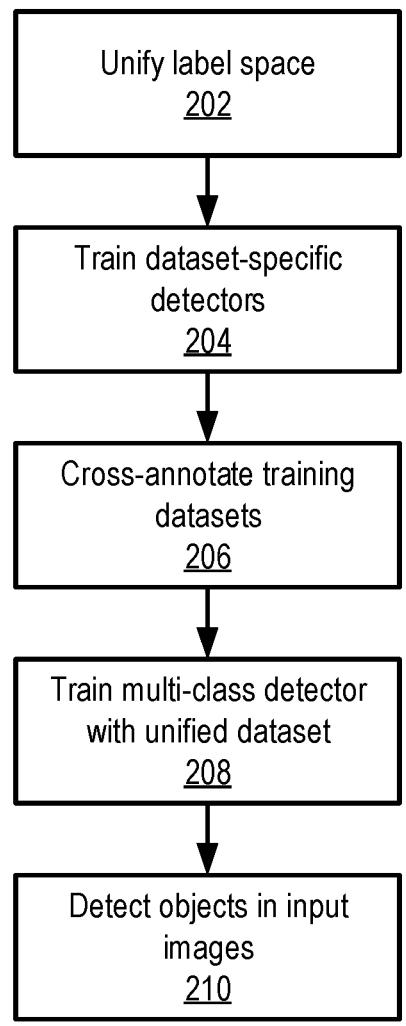
FIG. 2 is a block/flow diagram of a method for training a multi-class detector using multiple annotated datasets, in accordance with an embodiment of the present invention.

Referring now to FIG. 2, an object detection method is shown that uses unified datasets for multiple different object classes. Block 202 unifies the label space of the multiple datasets, where the term "label space" may be used to refer to the set of object classes that are annotated within a given dataset. This includes unifying the object classes defined by the datasets. For example, two datasets may include semantic duplicates of one or more object classes, with both datasets representing the same class of object (e.g., automobiles). These semantic duplicates may be merged. While in most cases the label spaces of the different datasets may be different, it is also contemplated that the multiple datasets may share a single label space, in which case the label space need not be unified in block 202.

The datasets may indicate the presence of an object in an image with an appropriate bounding box, or other border, that identifies the location of the object within the image. Each annotation may include, for example, coordinates in the image space (identifying corners of a bounding box) that tightly enclose the object and a class label that identifies the object within the bounding box. Bounding boxes may overlap, for example in cases where identified objects overlap in the image.

The background category of the different datasets may also be merged, although the definition for the background may differ from one dataset to the next. Ambiguity in this merge may be resolved with the use of a loss function and a pseudo ground truth.

In one representation, N datasets may be represented as $D_1, \ldots, D_N$, with corresponding label spaces $L_1, \ldots, L_N$, each label space $L_i$ being a set of categories that are annotated in the dataset $D_i$. The label spaces need not be equal, and common categories are permitted between them. For example, many different object detection datasets are annotated for frequently appearing features, such as people. The background $b_i$ for a dataset $D_i$ may be different for each dataset, making the complete label space for a dataset $L_i \cup b_i$. Merging the dataset-specific background for the different datasets is described in greater detail below.

The dataset $D_i$ may include $M_i$ images $I_{i,j}$, where $j=1, \ldots, M$. The true ground truth annotations for image $I_{i,j}$ may be represented as $G_{i,j}=\{g_{i,j}^k=(x_1, y_1, x_2, y_2, c)^k, k=1, \ldots, |G_{i,j}|\}$, with each ground truth annotation $g_{i,j}^k$ corresponding to an object k in the image $I_{i,j}$ and including bounding box coordinates $(x_1, y_1, x_2, y_2)$ in the image space and a category label $c \in L_i$. Any region of the image $I_{i,j}$ that is not covered by any bounding box in $G_{i,j}$ is considered to be in the background $b_i$. Unifying the label spaces creates a new label space $L_U = L_1 \cup \ldots \cup L_N$, such that an object detector that is trained on the $L_U$ will detect objects from all object classes.

Block 204 trains dataset-specific detectors. Because there is no background category ambiguity for detectors that are trained on individual datasets, these respective detectors can be used to identify and annotate objects within images from the various datasets, according to the annotations of each detector's training datasets. Unsupervised domain adaptation may be used to improve the performance of dataset-specific detectors when applied on the other datasets.

Any appropriate detector framework may be used, but the use of a neural network is specifically contemplated. For example, a regions with convolutional neural network features (R-CNN) system can be used with feature pyramid networks (FPN) as the object detector. An input image may be provided, and convolutional features may be extracted with a "backbone" network. A region proposal network (RPN) may then be used to predict a set of bounding boxes that describe potential objects in a category-agnostic fashion. A region classification network may then classify each proposal into the defined label space and may refine the localization.

Block 206 then uses the dataset-specific detectors to cross-annotate the datasets for other object classes, providing a pseudo ground truth for missing annotations of the various object classes. This helps to mitigate the ambiguity of the background category in the images from various datasets. The dataset-specific detectors each attempt to classify every potential object in each of the other datasets' images, establishing a pseudo-ground truth that adds to the true ground truth of each dataset's original annotations.

Block 208 then uses the union of the annotated datasets to train a detector with the unified label space. The object detectors may be implemented, for example, as deep neural networks, with parameters that are adjusted based on the applied training data. A loss function may be used to measure the difference between a ground truth and the current detection model's predictions for a given image of the training data. The model's parameters may be differentiable with respect to the loss function. Optimization, such as a stochastic gradient descent, can be used to update the parameters.

Thus, for an image $I_{i,j}$, having annotations $G_{i,j}$, from a label space $L_i$, an object detector trained on the unified label space $L_U$ outputs a set of detections $d_U^l$. Block 208 may compute the intersection-over-union (IOU) similarity $s_{kl}$ between $g_{i,j}^k$ and $d_U^l$. All predicted boxes $d_U^l$, with $s_{kl} > \tau$, for any object k, are compared with the ground truth label of the corresponding $g_{i,j}^k$. Any ambiguous matches are further processed to determine whether they should be considered as part of the background $b_i$, or ignored.

Block 210 can then use the trained detector to identify any or all of the object classes within new input images. For a given image, block 210 may return a set of bounding boxes, each representing a respective detected object. Each new detection may include a set of coordinates to determine the bounding box, a corresponding label for the detected object, and a score. The score, for example a number between 0 and 1, indicates a degree of confidence for the detected object's label.

The training in block 210 may use a loss function that takes partially annotated data into account, for example by leveraging the pseudo-labels generated in block 206 to generate a pseudo ground truth. The pseudo ground truth may therefore be a noisy estimate of the true ground truth which would be generated by a human's manual annotations.

The loss function may include a matching strategy that assigns predicted boxes to ground truth boxes and a function for measuring the discrepancy between them. Given an image from a training dataset, the detection model first predicts the object locations in the image, which are matched with a given ground truth (e.g., the true ground truth, provided in the original datasets). These matched predictions can be put into a loss function for classification (e.g., cross entropy) and localization (e.g., the $l_1$ or $l_2$ distance). Any unmatched detections may further be checked against pseudo ground truth generated by block 206.

For ambiguous object detections $\overline{D}$, a constraint may be that the true label of the ambiguous detections in a given image $I_{i,j}$ may not belong to any label in $L_i$, as these categories were already annotated. The probability distribution for a predicted bounding box over the unified label space $L_\cup$ and background may be expressed as $p=[p_1, p_2, \ldots] \in \mathbb{R}^{|L_\cup|+1}$, with $\Sigma_{c=1}^{|L_\cup|+1} p_c = 1$. If the predicted bounding box is assigned to any of the ground truth boxes in $G_{i,j}$ with a label $a \in L_i$, then it contributes to an entropy loss term:

$$\mathcal{L}^+(p, a) = CE(1^a, p) = -\sum_c 1_c^a \log(p_c)$$

where $1^a \in \mathbb{R}^{|L_\cup|+1}$ is a one-hot-vector encoding of label a. For example, $1_i^a = 1$ if i=a, and equals zero otherwise.

If the predicted box belongs to $\overline{D}$, then the underlying ground truth category can belong to any of $L_* = (L_\cup \setminus L_i) \cup b_\cup$, where $b_\cup$ is the unified background from the different datasets. The following loss function can therefore be used:

$$\mathcal{L}_{sum}^-(L_*, p) = -\log\left(\sum_{c \in L_*} p_c\right)$$

which resembles a cross-entropy loss on the sum of the ambiguous categories, and which can be interpreted as a merging of all ambiguities into one category. To encourage selectivity and to prevent the spread of probability mass over many categories, a minimum entropy regularization can be added:

$$\mathcal{L}_{sum+me}^-(L_*, p) = -\mathcal{L}^{-a}(L_*, p) - \lambda \sum_{c \in L_*} p_c \log(p_c)$$

where $\lambda$ is a hyper-parameter. Another loss function may be expressed as:

$$\mathcal{L}_{max}^-(L_*, p) = -\log\left(\max_{c \in L_*} p_c\right)$$

which may replace the sum of $\mathcal{L}_{sum}^-$ with a maximum over the ambiguous categories, thus encouraging a single category to be picked directly, without the need for an entropy term.

However, none of these loss functions resolve the label space ambiguities. Although they encode the fact that an ambiguous category in $L_*$ may be correct, they do not use any prior on the categories. Pseudo-labeling may thus be used to leverage the dataset-specific detectors to provide such a prior, by estimating missing annotations.

As noted above, the dataset-specific detectors are trained, in block 204, using individual respective datasets. N such detectors may be used, one for each respective dataset. Each dataset-specific detector may be trained in a different way, appropriate to the training dataset in question. The dataset-specific detectors may be trained independently, with each having a separate feature extraction backbone. The dataset-specific detractors may be trained using a shared backbone, followed by N separate detector heads.

Because the dataset-specific detectors are trained on a first dataset $D_j$, but are applied to another dataset $D_i$ to augment annotations, the domain gap between the datasets may be considered. Joint training may produce better results, because part of the network may be shared across domains. Another option for training the dataset-specific detectors is to leverage domain adaptation, making it possible to domain-adapt a detector, trained on one dataset, to all other datasets.

When training the unified detector, in block 208, mini-batches of data from individual datasets may be used to provide an efficient gradient computation. For an image $I_{i,j}$, originally from dataset $D_i$, with label space $L_i$, the ground truth for categories in $L_i$ are available, but those in $L_*$ are not. To remedy this, all of the dataset-specific detectors may be run across all of the datasets, to determine a set of bounding boxes $\hat{G}_{*,j}$ of the label space $L_*$ for an image j. These bounding boxes are the pseudo ground truth. Each pseudo ground truth box $\hat{g}_{*,j}^k$ has a detection score $\mathcal{S}_{det}(\hat{g}_{*,j}^k)$ associated with it.

A loss function for the unified object detector may leverage the pseudo ground truth as a prior to resolve the label space ambiguity. The pseudo ground truth contains noise, owing to the domain gap between datasets and errors that may be present in the output of the dataset-specific detectors. Thus, given a set of unmatched detections $\overline{D}$ and all pseudo ground truth boxes $\hat{G}_{*,j}$ the IOU similarity $s_{k,l}$ between $\overline{d}_l \in \overline{D}$ and $\hat{g}_{*,j}^k \in \hat{G}_{*,j}$ can be computed for all l and k. All pseudo ground truth boxes with sufficiently high IOU similarities (e.g., $s_{l,k} > \tau$) are kept. Keeping multiple matches with pseudo ground truth counters the uncertainty of pseudo labeling and averages out potential noise.

Suppose, for each box $\overline{d}_l$ that is not matched to $G_{i,j}$, a set of matched pseudo ground truth boxes can be determined as $\hat{G}_{*,j}^m = \{\hat{g}_{*,j}^k | s_{l,k} > \tau \wedge \mathcal{S}_{det}(\hat{g}_{*,j}^k) > \kappa_{bg}\}$, where $\mathcal{S}_{det}(\cdot)$ is the detection score and where $\kappa_{bg}$ is a threshold that defines a minimum score for detection as a pseudo ground truth class, with anything below the threshold to be considered as a background. If $\hat{G}_{*,j}^m$ is empty, the ground truth label for $\overline{d}_l$ may be set to "background," and a cross-entropy loss may be used. Otherwise, the following loss function may be used on the predicted class distribution $p_l$ of $\overline{d}_l$:

$$\mathcal{L}_P(p_l, \hat{G}_{*,j}^m) = \frac{1}{Z} \sum_k \Gamma(\mathcal{S}_{det}(\hat{g}_{*,j}^k)) \cdot CE(p_l, c(\hat{g}_{*,j}^k))$$

where $\Gamma(\cdot)$ is an importance function for a ground truth. The loss is the sum over the matched pseudo ground truth boxes, weighted over the importance, normalized by $Z=\max(\in_k \Gamma(S_{det}(\hat{g}_{*,j}^k)), \epsilon)$, where $\epsilon$ is a small constant that prevents division-by-zero in the case that all $\hat{g}_{*,j}^k$ are weighted 0. The weighting function may be defined in any appropriate way. For example, $\Gamma(x)=x$, weighting by the score itself, is one simple approach. Another possibility, establishes a hard threshold, with scores above a threshold having a weight of 1, and scores below the threshold having a weight of 0.

For boxes that are matched with the pseudo ground truth, with a confidence above a first threshold (e.g., about 0.6), another classification can be performed. If the prediction is matched with a pseudo ground rule that below the first threshold, but above a second threshold (e.g., about 0.1), the prediction may be ignored entirely in the loss computation. If the prediction is matched with a confidence score below the second threshold (e.g., below about 0.1), or is not matched with any ground truth, the prediction may be treated as a background for classification. Thus, ambiguous results may be ignored. The particular values of the first threshold and the second threshold may be set to any appropriate value that yields the best performance.

Figure 3:
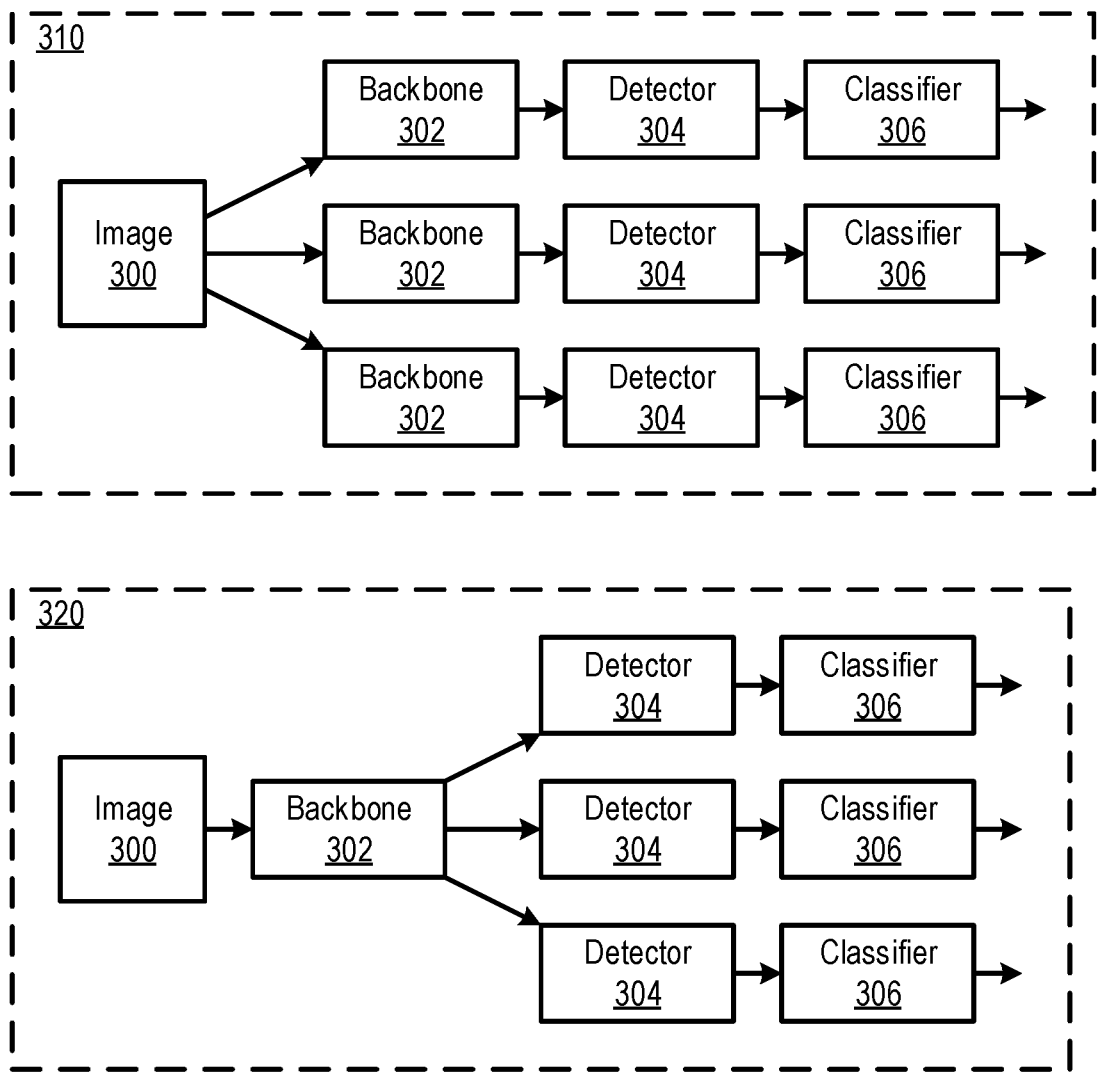
FIG. 3 is diagram of different implementations of dataset-specific object detectors, in accordance with an embodiment of the present invention.

Referring now to FIG. 3, exemplary neural network structures are shown for the dataset-specific object detector. In a first structure 310, each dataset-specific detector is trained with a separate backbone 302, which may be implemented with, for example, an R-CNN network. The detector 304 may be implemented as an RPN to predict the bounding boxes of objects. A classifier 306 then determines one or more labels for each of the predicted bounding boxes. Each dataset-specific detector then includes a separate backbone 302, detector 304, and classifier 306, each of which separately processes an input image 300.

In a second structure 320, the dataset-specific detectors all share a single backbone 302. This shared backbone 302 processes the input image 300, before separate detectors 304 and classifiers 306 operate on it. The backbone 302 may be interpreted as a feature extractor for object detection. It may take raw image information as an input and may generate intermediate features. These features may be taken as input by the detection-specific parts of the neural network.

When optimizing the neural network, information flows through the detection-specific parts back to the feature extractor(s). So, when training the backbone 302 in a shared fashion (e.g., in structure 320), this part of the neural network receives backpropagated information from all datasets. In contrast, the detection-specific parts only get updates from their respective datasets. This is distinct from the training of a unified detector, where all parts of the unified detector receive information from all datasets.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

Figure 4:
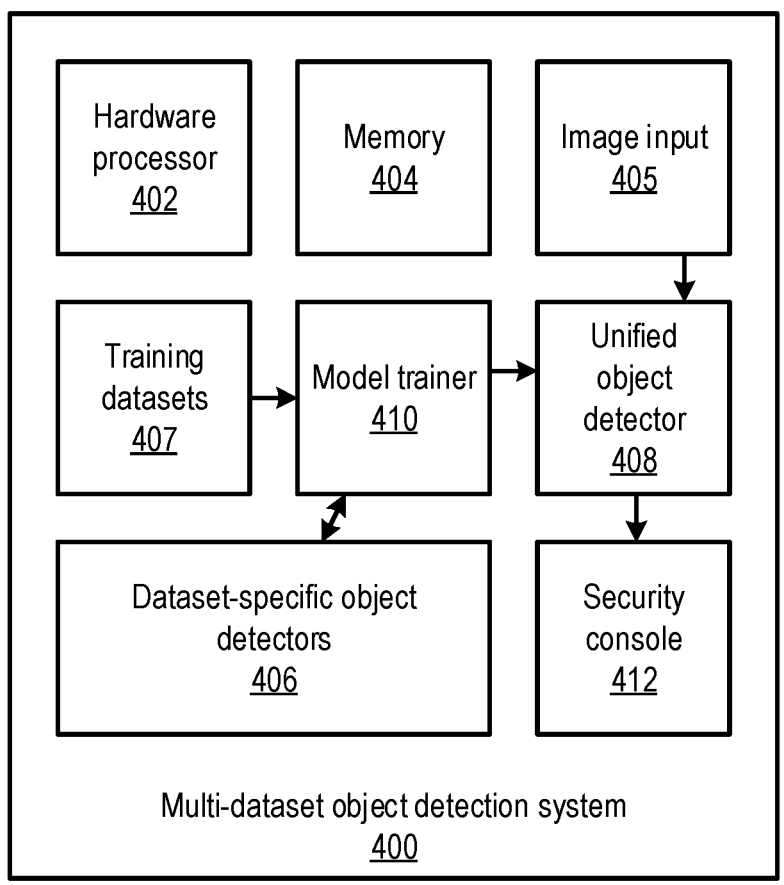
FIG. 4 is a block diagram of a multi-dataset object detection system, in accordance with an embodiment of the present invention.

Referring now to FIG. 4, a multi-dataset object detection system 400 is shown. The system 400 includes a hardware processor 402 and a memory 404. An image input 405 may represent a source of image data, such as a camera or a user input, that may include one or more objects of interest. For example, the image input 405 may represent a stream from a security video camera, where the detection of people in the images of the video stream may be needed to identify a dangerous or insecure condition.

A model trainer 410 trains a unified object detector 408 to detect multiple classes of objects within the image input 405. These multiple classes of objects are annotated in multiple original training datasets 407, and each of the training datasets 407 may have one or more object class annotations that are not provided in the rest of the training datasets 407. Thus, the model trainer 410 trains the unified object detector 408 to detect all of the objects within the training datasets 407.

The model trainer 410 trains multiple dataset-specific object detectors 406, for example training a separate dataset-specific object detector 406 for each respective dataset of the training datasets 407. The model trainer 410 uses these dataset-specific object detectors 406 to cross-annotate the training datasets 407, identifying a "pseudo ground truth" for all of the object classes, across all of the images in the multiple training datasets 407. These pseudo ground truths, represented by the cross-annotations, are used in combination with the true ground truths, represented by the original annotations, to train the unified object detector 408.

The dataset-specific object detectors 406 and the unified object detector 408 may all be implemented as artificial neural networks (ANNs), for example using a shared "backbone" or separate backbones, as described above. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 5:
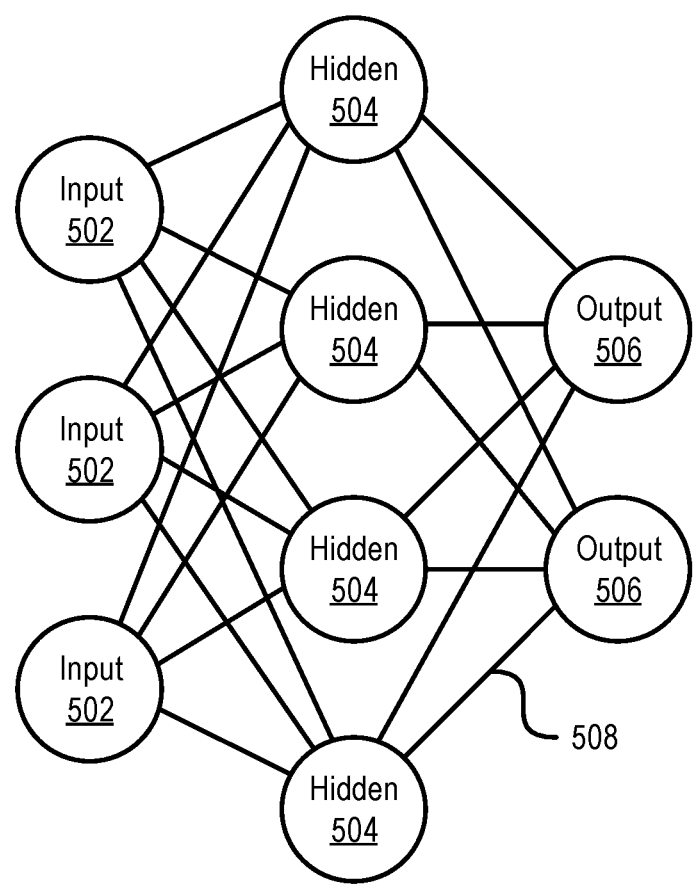
FIG. 5 is a high-level neural network diagram in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There may be any number of layers of hidden neurons 504, and as well as neurons that perform different functions. There exist different neural network structures as well, such as convolutional neural network, maxout network, etc. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

Figure 6:
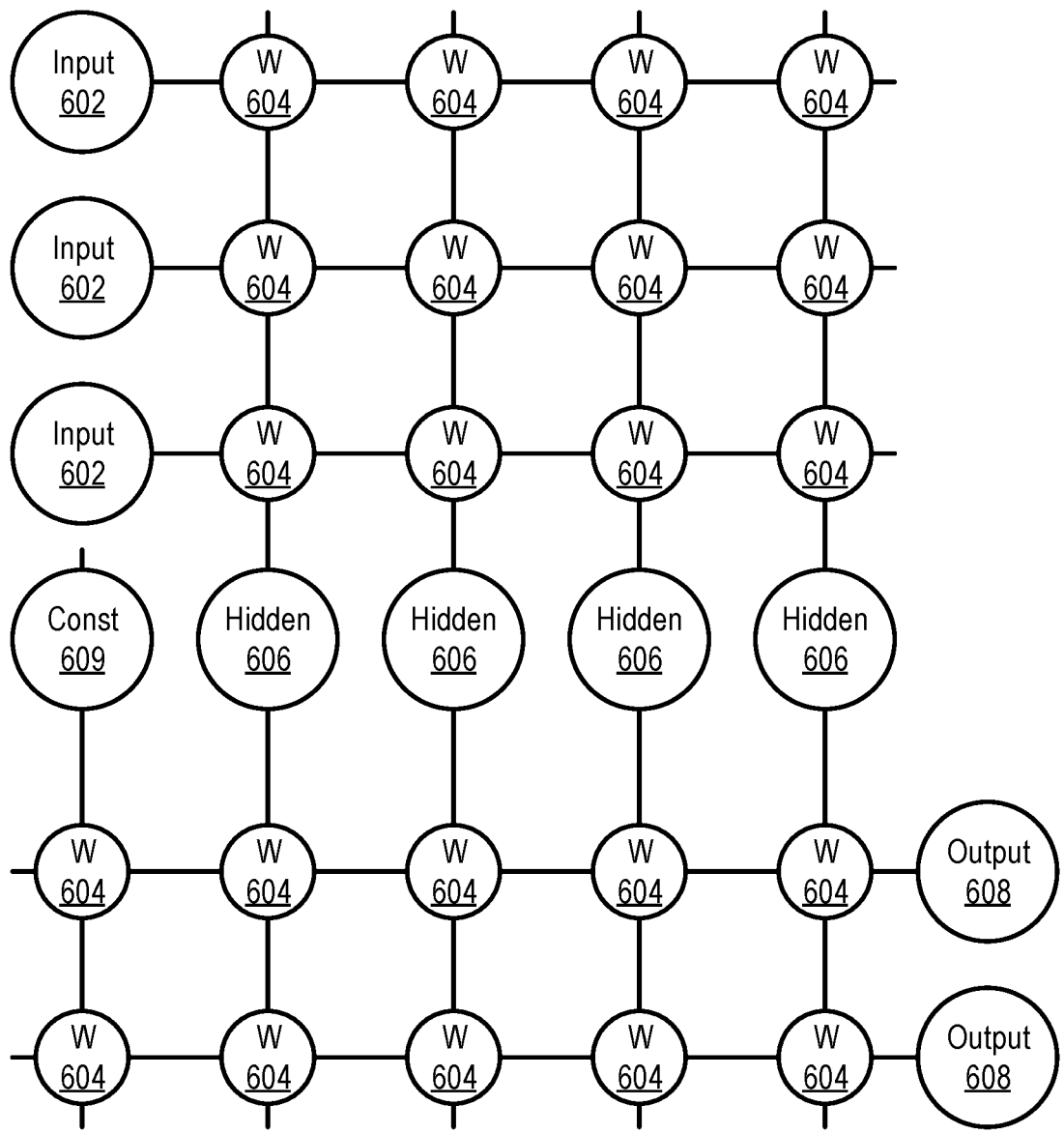
FIG. 6 is a diagram of an exemplary neural network architecture, in accordance with an embodiment of the present invention.

Referring now to FIG. 6, an ANN architecture 600 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 602 each provide an input signal in parallel to a respective row of weights 604. The weights 604 each have a respective settable value, such that a weight output passes from the weight 604 to a respective hidden neuron 606 to represent the weighted input to the hidden neuron 606. In software embodiments, the weights 604 may simply be represented as coefficient values that are multiplied against the relevant signals. The signals from each weight adds column-wise and flows to a hidden neuron 606.

The hidden neurons 606 use the signals from the array of weights 604 to perform some calculation. The hidden neurons 606 then output a signal of their own to another array of weights 604. This array performs in the same way, with a column of weights 604 receiving a signal from their respective hidden neuron 606 to produce a weighted signal output that adds row-wise and is provided to the output neuron 608.

It should be understood that any number of these stages may be implemented, by interposing additional layers of arrays and hidden neurons 606. It should also be noted that some neurons may be constant neurons 609, which provide a constant output to the array. The constant neurons 609 can be present among the input neurons 602 and/or hidden neurons 606 and are only used during feed-forward operation.

During back propagation, the output neurons 608 provide a signal back across the array of weights 604. The output layer compares the generated network response to training data and computes an error. The error signal can be made proportional to the error value. In this example, a row of weights 604 receives a signal from a respective output neuron 608 in parallel and produces an output which adds column-wise to provide an input to hidden neurons 606. The hidden neurons 606 combine the weighted feedback signal with a derivative of its feed-forward calculation and stores an error value before outputting a feedback signal to its respective column of weights 604. This back propagation travels through the entire network 600 until all hidden neurons 606 and the input neurons 602 have stored an error value.

During weight updates, the stored error values are used to update the settable values of the weights 604. In this manner the weights 604 can be trained to adapt the neural network 600 to errors in its processing. It should be noted that the three modes of operation, feed forward, back propagation, and weight update, do not overlap with one another.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for object detection, comprising:
    training a plurality of dataset-specific object detectors using respective annotated datasets, each of the annotated datasets including annotations for a respective set of one or more object classes;
    cross-annotating the annotated datasets using the dataset-specific object detectors;
    training a unified object detector, using the cross-annotated datasets, to detect all of the object classes of the annotated datasets; and
    detecting objects in an input image using the unified object detector.

2. The method of claim 1, wherein training the unified object detector uses annotations of the annotated datasets as a true ground truth and uses cross-annotations by the dataset-specific object detectors as a pseudo ground truth.

3. The method of claim 1, wherein the annotations each include a bounding box for an object and an object class.

4. The method of claim 1, wherein the plurality of dataset-specific object detectors are trained using a shared backbone.

5. The method of claim 1, wherein the plurality of dataset-specific object detectors are trained using separate respective backbones.

6. The method of claim 1, wherein each of the annotated datasets includes annotations for at least one object class that is not annotated in any of the other annotated datasets.

7. The method of claim 1, wherein cross-annotating the annotated datasets comprises performing object detection on a first annotated dataset using a dataset-specific object detectors that is trained on a second annotated dataset to detect one or more provisional objects that belong to the one or more object classes of the second annotated dataset.

8. The method of claim 7, wherein cross-annotating the annotated datasets further comprises:
    determining a confidence score for each of the one or more detected provisional objects;
    comparing the confidence score for each of the one or more detected provisional objects to a first threshold and a second threshold;
    annotating the one or more detected provisional objects in accordance with the comparison.

9. The method of claim 8, wherein annotating the one or more detected provisional objects includes discarding at least one of the one or more detected provisional objects, responsive to a determination that the confidence score for the at least one of the one or more detected provisional objects falls between the first threshold and the second threshold.

10. The method of claim 1, further comprising performing a computer vision task using the detected objects.

11. A system for object detection, comprising:
    a hardware processor; and
    a memory, configured to store computer program code that is executed by the hardware processor and that includes:
        machine learning code that implements a plurality of dataset-specific object detectors, each of which detects and annotates objects within input images according to training by a respective annotated dataset, each of the annotated datasets including annotations for a respective set of one or more object classes, wherein the plurality of dataset-specific object detectors cross-annotate the annotated datasets;
        machine learning code that implements a unified object detector that detects and annotates objects within input images according to training by multiple datasets;
        dataset-specific training code that trains the plurality of dataset-specific object detectors using respective annotated datasets;
        unified training code that trains the unified object detector, using the cross-annotated datasets, to detect all of the object classes of the annotated datasets; and
        object detection code that detects objects in an input image using the unified object detector.

12. The system of claim 11, wherein the unified object detector uses annotations of the annotated datasets as a true ground truth and uses cross-annotations by the dataset-specific object detectors as a pseudo ground truth.

13. The system of claim 11, wherein the annotations each include a bounding box for an object and an object class.

14. The system of claim 11, wherein the dataset-specific training code trains the plurality of dataset-specific object detectors using a shared backbone.

15. The system of claim 11, wherein the dataset-specific training code trains the plurality of dataset-specific object detectors using separate respective backbones.

16. The system of claim 11, wherein each of the annotated datasets includes annotations for at least one object class that is not annotated in any of the other annotated datasets.

17. The system of claim 11, wherein each of the plurality of dataset-specific object detectors is trained on a respective second annotated dataset and performs object detection on images in a set of first annotated datasets to detect one or more provisional objects that belong to the one or more object classes of the second annotated dataset.

18. The system of claim 17, wherein each of the plurality of dataset-specific object detectors further determines a confidence score for each of the one or more detected provisional objects in each of the images, compares the confidence score for each of the one or more detected provisional objects to a first threshold and a second threshold, and annotates the images in accordance with the comparison.

19. The system of claim 18, wherein each of the plurality of dataset-specific object detectors further discards at least one of the one or more detected provisional objects, responsive to a determination that the confidence score for the at least one of the one or more detected provisional objects falls between the first threshold and the second threshold.

20. The system of claim 11, wherein the computer program code further includes security code that performs a computer vision task using the detected objects.

* * * * *